(12) United States Patent
Sogawa et al.

(10) Patent No.: US 6,920,639 B2
(45) Date of Patent: Jul. 19, 2005

(54) OPTICAL PICKUP

(75) Inventors: Teruaki Sogawa, Osaka (JP); Fumiaki Mori, Osaka (JP); Noritaka Tanabe, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 148 days.

(21) Appl. No.: 10/657,129

(22) Filed: Sep. 9, 2003

(65) Prior Publication Data
US 2004/0114496 A1 Jun. 17, 2004

(30) Foreign Application Priority Data
Sep. 10, 2002 (JP) .................................. 2002-005738 U

(51) Int. Cl.$^7$ .......................... G11B 7/085; G11B 17/00
(52) U.S. Cl. ................................. 720/685; 369/244.1
(58) Field of Search ................................. 720/685, 683, 720/648; 369/215.1, 244.1, 247.1; 359/814, 824

(56) References Cited
U.S. PATENT DOCUMENTS

| | | | | |
|---|---|---|---|---|
| 5,109,368 A | * | 4/1992 | Ohta et al. ............... 369/44.14 |
| 5,323,378 A | * | 6/1994 | Kim et al. ................... 720/684 |
| 6,463,019 B2 | * | 10/2002 | Kawano et al. .......... 369/44.14 |
| 2003/0035358 A1 | * | 2/2003 | Ito ......................... 369/112.01 |
| 2003/0123374 A1 | * | 7/2003 | Matsumura et al. ........ 369/215 |
| 2003/0161251 A1 | * | 8/2003 | Shimada et al. ............ 369/244 |
| 2004/0076107 A1 | * | 4/2004 | Sogawa et al. ............. 369/244 |

FOREIGN PATENT DOCUMENTS

JP    A-2001-67710    3/2001

* cited by examiner

*Primary Examiner*—Allen Cao
(74) *Attorney, Agent, or Firm*—Morgan Lewis & Bockius LLP

(57) ABSTRACT

An optical pickup has a support pedestal integrally formed at a rear end portion of a mounting surface of a base. A pair of left and right leg portions extend forwardly from both side edge portions of a rear end portion of a resilient plate. A fixing hole is penetratingly provided in each of the leg portions on a phantom line passing through a central axis of a photodiode and extending in a horizontal transverse direction. Each fixing screw is screwed into a threaded hole in the mounting surface through each fixing hole, so as to press the rear end portion of the resilient plate against the support pedestal.

6 Claims, 9 Drawing Sheets

OPTICAL PICKUP

BACKGROUND OF THE INVENTION

1. Field of the Invention

The present invention relates to an optical pickup for use in a disk player such as a CD player or a DVD player, and more particularly to an optical pickup in which a photodiode can be positioned precisely.

2. Description of the Related Art

JP-A-2001-67710 discloses conventional techniques regarding optical pickups. JP-A-2001-67710 discloses an optical pickup in which an objective lens is disposed at one end opening of a light passage hole with a half mirror. The light passage hole is provided penetratingly in a synthetic resin-made base. A laser diode is disposed in a laser hole communicating with the light passage hole. A mounting surface is formed on the other end opening of the light passage hole. A resilient plate is secured to the mounting surface by a screw. The resilient plate has on one end thereof an opening on which a photodiode is disposed, and has on the other end thereof a screw hole through which the screw is inserted. The photodiode is positioned in X-Y-Z directions by adjusting the screwing amount of the screw.

In the above-described construction, since an interval between the screw, which is a reference for fixing the resilient plate, and the photodiode is large, as the base is thermally expanded by the heat generated by the laser diode, the optical axis of the laser light is likely to be offset from the central axis of the photodiode in the horizontal longitudinal direction. Consequently, an error can possibly occur in the reading by the photodiode.

SUMMARY OF THE INVENTION

In view of the above-described problems, an object of the present invention is to provide an optical pickup that makes it possible to precisely position a photodiode with a simple and inexpensive structure.

To attain the above object, according to a first aspect of the invention, there is provided an optical pickup including: a synthetic resin-made base in which a collimator lens and an objective lens are disposed at one end opening of a light passage hole with a half mirror, the base having a mounting surface formed on another end opening of the light passage hole that is penetrating the base; a laser diode disposed in a laser hole communicating with the light passage hole; a resilient plate made of a leaf spring having a first end portion secured to the mounting surface in such a manner as to be heightwise adjustable by an adjusting screw, and a pair of left and right leg portions formed integrally at both side edge portions of a second end portion that is opposite to the first end portion, the leg portions extending toward the first end portion along a horizontal longitudinal direction; and a printed circuit board with a photodiode, the printed circuit board secured to the resilient plate while being positioned in the horizontal longitudinal direction and a horizontal transverse direction; wherein laser light is projected from the laser diode onto a disk through the half mirror, the collimator lens, and the objective lens, and reflected light thereof is received by the photodiode through the half mirror, so as to read information recorded on the disk; a support pedestal which is one step higher is integrally formed at an end portion of the mounting surface; a pair of fixing holes are respectively formed in the leg portions in such a manner as to be provided on a phantom line passing through a central axis of the photodiode and extending in the horizontal transverse direction; a pair of threaded holes are respectively formed in both side edge portions of the mounting surface in face-to-face relation to the fixing holes; an elongated engaging hole is penetratingly provided in a tip end portion of one of the leg portions along the horizontal longitudinal direction; an elliptical positioning projection is projectingly provided on one of the side edge portions of the mounting surface in face-to-face relation to the engaging hole; each of the leg portions is positioned on the mounting surface by engaging the positioning projection with the engaging hole; and the fixing screws are respectively screwed into the threaded holes through the fixing holes in the leg portions, so as to press the second end portion of the resilient plate against the support pedestal.

According to the above-described construction, since the second end portion of the resilient plate is pressed against the support pedestal, at the time when the height of the resilient plate is adjusted by the adjusting screw, and the positioning of the photodiode is effected by moving the printed circuit board, which is disposed on the resilient plate, by fine adjustment in the horizontal direction, the second end portion of the resilient plate is not swung vertically as in the conventional manner. The photodiode can thus be positioned precisely in the vertical direction.

In addition, the second end portion of the resilient plate is not fixed, and a central portion of the resilient plate is set in a state of being fixed to the center of the base by the fixing screws by means of the leg portions. Therefore, even if the base is thermally expanded, the optical axis of the laser light projected from the laser diode is prevented from becoming offset in the horizontal longitudinal direction from the central axis of the photodiode provided in the central portion of the resilient plate. The accuracy of reading by the photodiode can be maintained at a high level.

Further, as the elliptical positioning projection provided projectingly on the mounting surface is merely engaged with the elongated engaging hole provided penetratingly in one leg portion, the resilient plate can be disposed at a predetermined position on the mounting surface, and each fixing hole can be positioned concentrically with each threaded hole. Therefore, each fixing screw can be speedily and easily screwed into each threaded hole through each fixing hole.

Furthermore, since the support pedestal is merely formed on the mounting surface of the base, the structure of a mold for molding the base is simple, so that the cost of the mold becomes low. Since a weak portion in terms of strength such as the hook is not provided on the mounting surface, no damage is caused.

According to a second aspect of the invention, there is provided an optical pickup including: a synthetic resin-made base having a mounting surface formed thereon; a resilient plate having a first end portion secured to the mounting surface in such a manner as to be heightwise adjustable by an adjusting screw, and a pair of left and right leg portions formed integrally at both side edge portions of a second end portion that is opposite to the first end portion, the leg portions extending toward the first end portion along a horizontal longitudinal direction; a printed circuit board with a photodiode, the printed circuit board secured to the resilient plate while being positioned in the horizontal longitudinal direction and a horizontal transverse direction; and a laser diode; wherein laser light is projected from the laser diode onto a disk, and reflected light thereof is received by the photodiode, so as to read information recorded on the disk; a support pedestal which is one step higher is integrally formed on an end portion of the mounting surface; and a pair of fixing screws are respectively screwed into a pair of threaded holes in the mounting surface through a pair of fixing holes respectively provided penetratingly in the leg portions, so as to press the second end portion of the resilient plate against the support pedestal.

According to the above-described construction, since the second end portion of the resilient plate is pressed against the support pedestal, at the time when the positioning of the photodiode is effected by moving the printed circuit board, which is disposed on the resilient plate, by fine adjustment in the horizontal direction, the second end portion of the resilient plate is not swung vertically as in the conventional manner. The photodiode can thus be positioned precisely in the vertical direction.

According to a third aspect of the invention, each of the fixing holes is provided on a phantom line passing through a central axis of the photodiode and extending in the horizontal transverse direction.

According to the above-described construction, the second end portion of the resilient plate is not fixed, and a central portion of the resilient plate is set in a state of being fixed to the center of the base by the fixing screws by means of the leg portions. Therefore, even if the base is thermally expanded, the optical axis of the laser light projected from the laser diode is prevented from becoming offset in the horizontal longitudinal direction from the central axis of the photodiode provided in the central portion of the resilient plate. The accuracy of reading by the photodiode can be maintained at a high level.

According to a fourth aspect of the invention, an elongated engaging hole is penetratingly provided in a front end portion of one of the leg portions along the horizontal longitudinal direction, and an elliptical positioning projection is projectingly provided on the mounting surface in face-to-face relation to the engaging hole, the resilient plate being disposed at a predetermined position on the mounting surface by engaging the positioning projection with the engaging hole.

Further, as the elliptical positioning projection provided projectingly on the mounting surface is merely engaged with the elongated engaging hole provided penetratingly in one leg portion, the resilient plate can be disposed at a predetermined position on the mounting surface, and each fixing hole can be positioned concentrically with each threaded hole. Therefore, each fixing screw can be speedily and easily screwed into each threaded hole through each fixing hole.

DETAILED DESCRIPTION OF THE PREFERRED EMBODIMENTS

Figure 9:
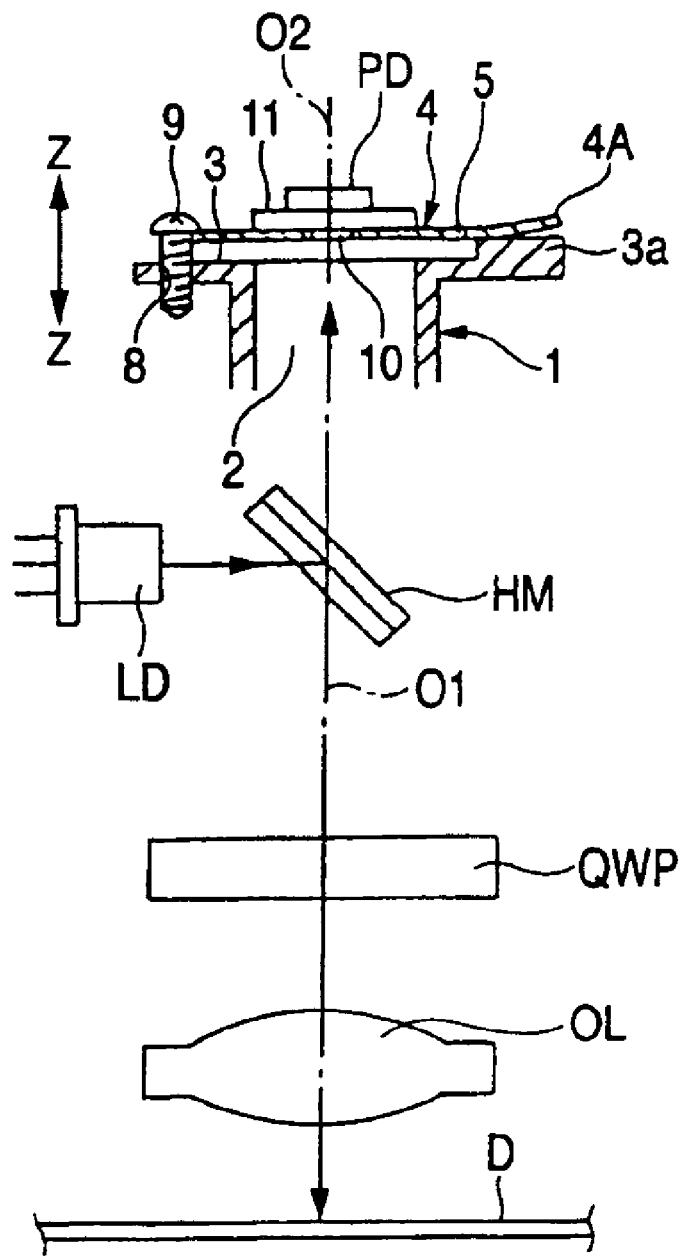
FIG. 9 is a schematic side view showing the optical pickup.

In an optical pickup, as shown in FIG. 9, a collimator lens QWP and an objective lens OL are disposed at one end opening of a light passage hole 2 with a half mirror HM provided penetratingly in a synthetic resin-made base 1. A laser diode LD is disposed in a laser hole communicating with the light passage hole 2. A mounting surface 3 is formed on the base 1, on the other end opening of the light passage hole 2. A support pedestal 3a which is one step higher is integrally formed at a rear end portion of the mounting surface 3. Laser light is projected from the laser diode LD onto a disk D such as CD or DVD through the half mirror HM, the collimator lens QWP, and the objective lens OL, and its reflected light is received by a photodiode PD through the half mirror HM. Information recorded on the disk D is thereby read.

FIGS. 1 to 6 show an optical pickup in accordance with an embodiment of the invention. A support pedestal 3a which is one step higher by a predetermined interval α (e.g., 0.5 to 2 mm) is integrally formed at a rear end portion of the mounting surface 3 of the base 1. A pair of left and right leg portions 4C and 4D formed integrally at both side edge portions of a rear end portion 4A of a resilient plate 4 extend forwardly along a horizontal longitudinal direction Y-Y. A fixing screw 6 is passed through a fixing hole 18 provided penetratingly in each of the leg portions 4C and 4D and is screwed into a threaded hole 8 in the mounting surface 3 so as to press the rear end portion 4A of the resilient plate 4 against the support pedestal 3a.

Figure 1:
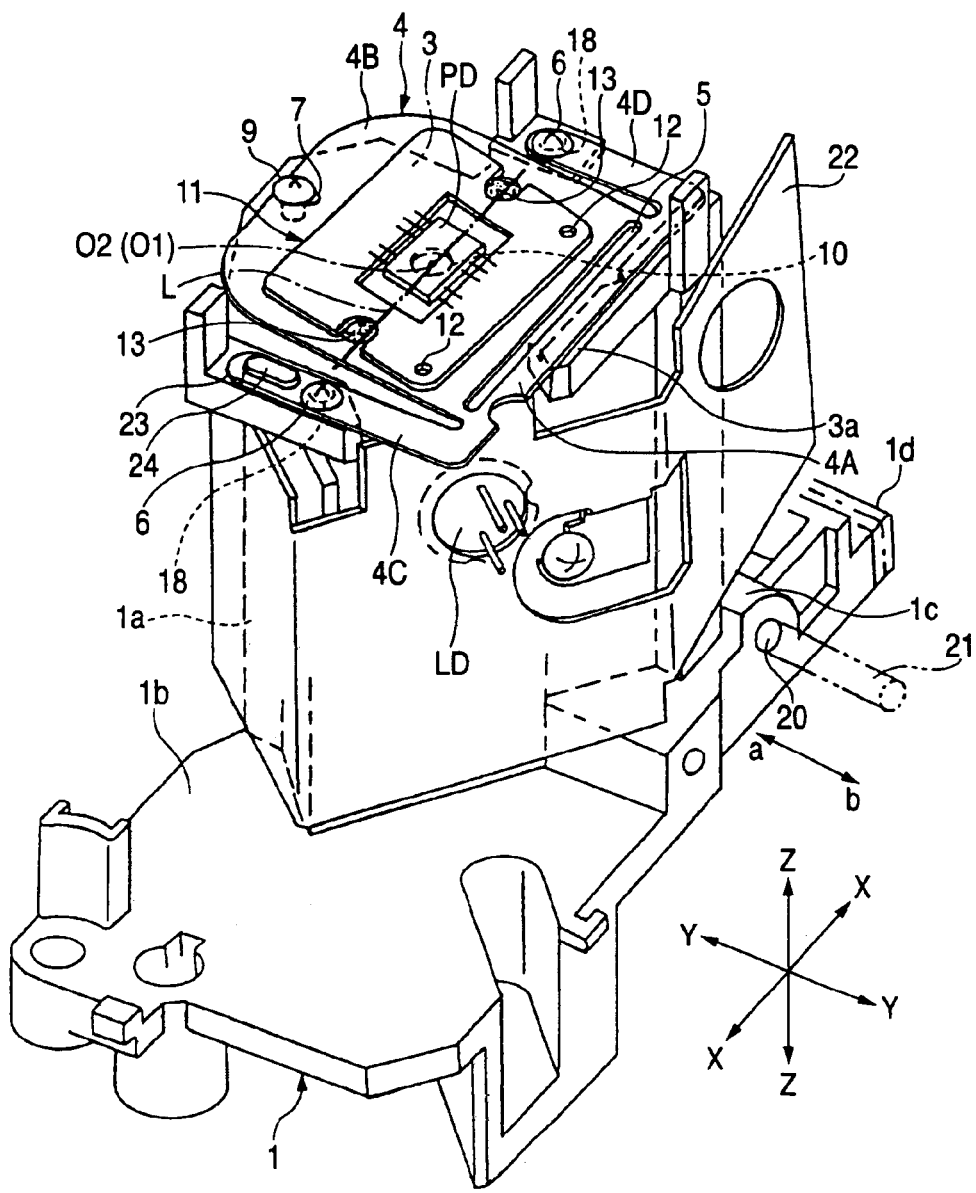
FIG. 1 is a perspective view showing an optical pickup according to an embodiment of the invention.

A pair of right and left hinge portions 4a are cut out by forming a slit 5 in the vicinity of the rear end portion of the resilient plate 4 made of a substantially rectangular leaf spring. As an adjusting screw 9 is screwed into a threaded hole 8 in the mounting surface 3 through an engaging slot 7 formed in a front end portion 4B of the resilient plate 4, the resilient plate 4 is secured to the mounting surface 3 such that its height is adjustable in a vertical direction Z. A printed circuit board 11 with a photodiode PD is secured on the resilient plate 4 in face-to-face relation to a central through hole 10 in the resilient plate 4 by being positioned in a horizontal transverse direction X-X and in a horizontal longitudinal direction Y-Y. In FIG. 1, reference numeral 12 denotes an operation hole provided penetratingly in each corner of a rear portion of the printed circuit board 11, and 13 denotes an ultraviolet-curing adhesive.

According to the above-described construction, since the rear end portion 4A of the resilient plate 4 is pressed against the support pedestal 3a, at the time when the height of the resilient plate 4 is adjusted by an adjusting screw 9, and the positioning of a photodiode PD is effected by moving a printed circuit board 11, which is disposed on the resilient plate 4, by fine adjustment in the horizontal longitudinal direction Y-Y and in a horizontal transverse direction X-X, the rear end portion 4A of the resilient plate 4 is not swung vertically as in the conventional manner. The photodiode PD can thus be positioned precisely in a vertical direction Z.

As shown in FIG. 1, the base 1 has a tubular base body 1a having the mounting surface 3 formed thereon, a baseplate portion 1b formed integrally on the base body 1a, and a pair of brackets 1c and a rack 1d which are integrally provided projectingly on the baseplate portion 1*b*. A guide rod 21 is movably fitted in through holes 20 respectively formed in the brackets 1*c*. As a pinion (not shown) meshing with the rack 1*d* is rotated forwardly or reversely, the base 1 is moved back and forth a and b along the guide rod 21. It should be noted that reference numeral 22 denotes a radiating plate.

Figure 3:
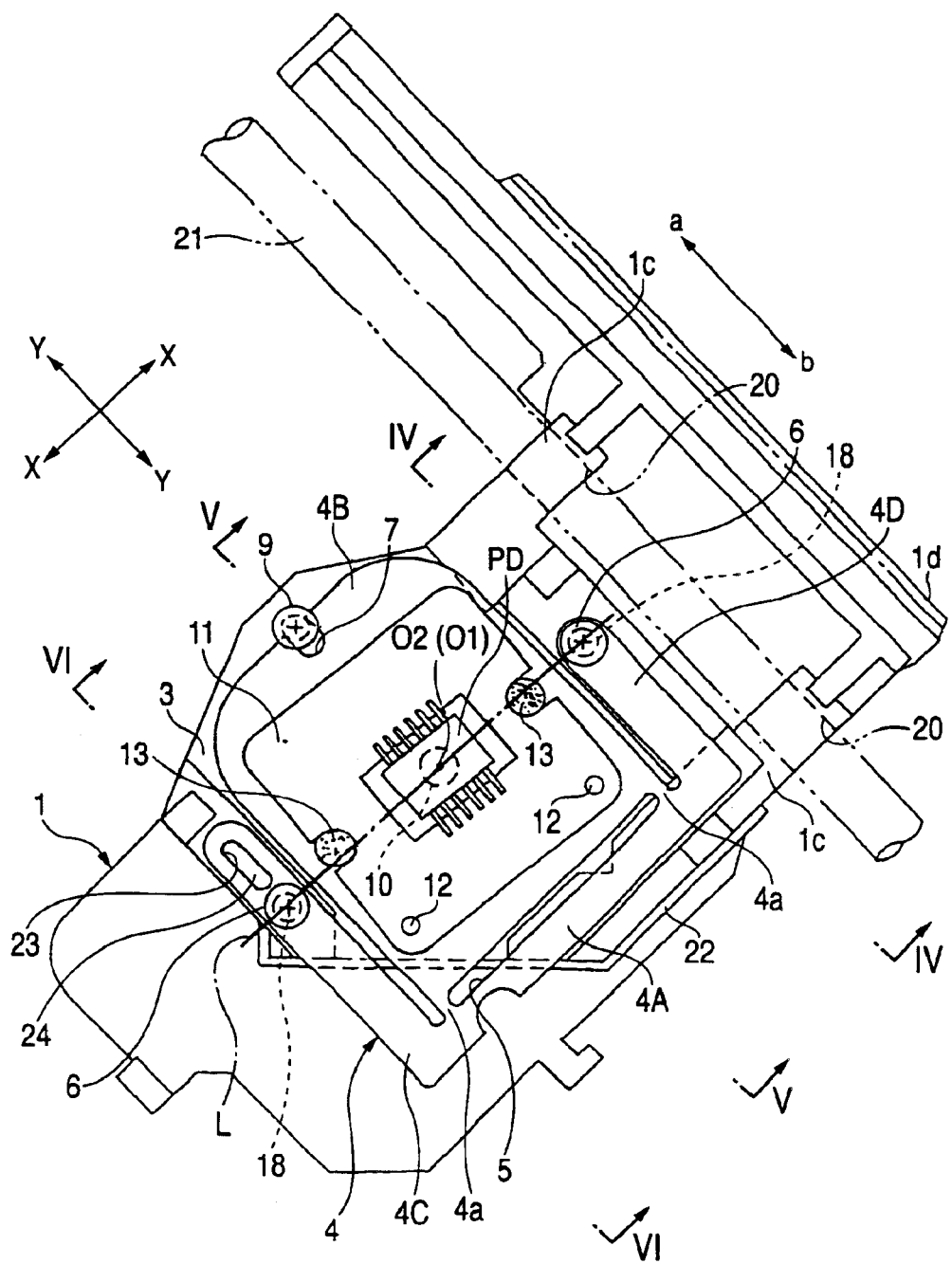
FIG. 3 is a plan view of the optical pickup.
Figure 4:
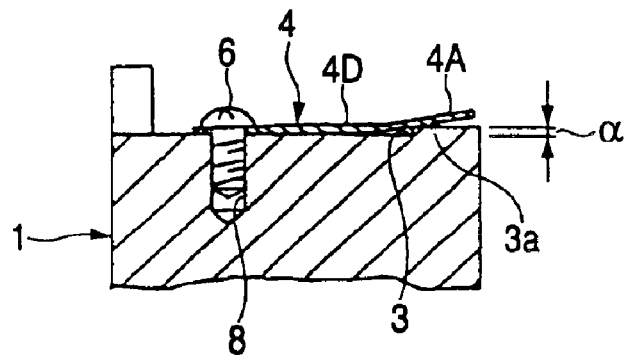
FIG. 4 is a sectional view taken along line IV—IV in FIG. 3.
Figure 5:
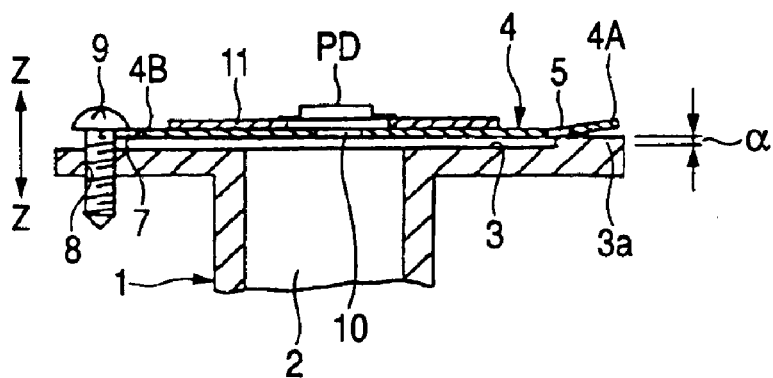
FIG. 5 is a sectional view taken along line V—V in FIG. 3.

As shown in FIG. 3, the fixing holes 18 in the leg portions 4C and 4D are provided on a phantom line L passing through the central axis O2 of the photodiode PD and extending in the horizontal transverse direction X-X. According to this arrangement, the rear end portion 4A of the resilient plate 4 is not fixed, and a central portion of the resilient plate 4 is set in a state of being fixed to the center of the base 1 by the fixing screws 6 by means of the leg portions 4C and 4D. Therefore, even if the base 1 is thermally expanded, the optical axis O1 of the laser light projected from the laser diode LD is prevented from becoming offset in the horizontal longitudinal direction Y-Y from the central axis O2 of the photodiode PD provided in the central portion of the resilient plate 4. The accuracy of reading by the photodiode PD can be maintained at a high level.

Figure 2:
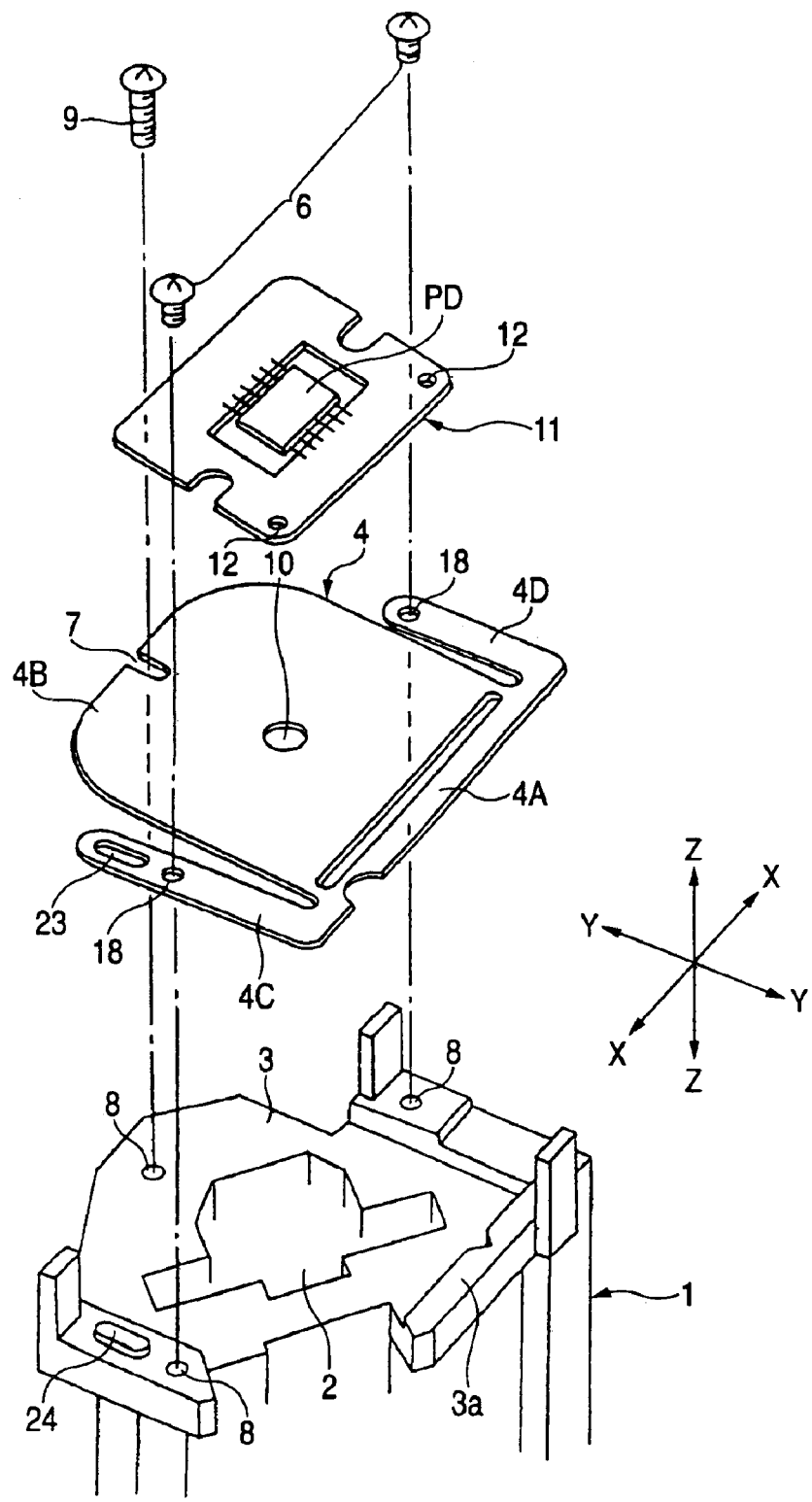
FIG. 2 is an exploded perspective view of essential portions of the optical pickup.
Figure 6:
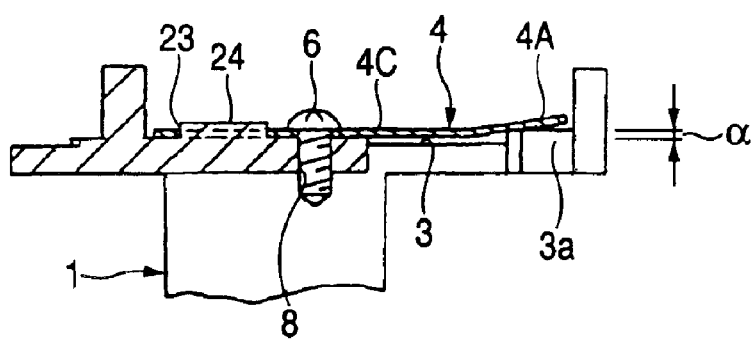
FIG. 6 is a sectional view taken along line VI—VI in FIG. 3.

As shown in FIGS. 2 and 6, an elongated engaging hole 23 is penetratingly provided in one leg portion 4C along the horizontal longitudinal direction Y-Y, and an elliptical positioning projection 24 is projectingly provided on the mounting surface 3 in face-to-face relation to the engaging hole 23. By merely engaging the positioning projection 24 with the engaging hole 23, the resilient plate 4 can be disposed at a predetermined position on the mounting surface 3, and each fixing hole 18 can be positioned concentrically with each threaded hole 8. Therefore, each fixing screw 6 can be speedily and easily screwed into each threaded hole 8 through each fixing hole 18.

Figure 7A:
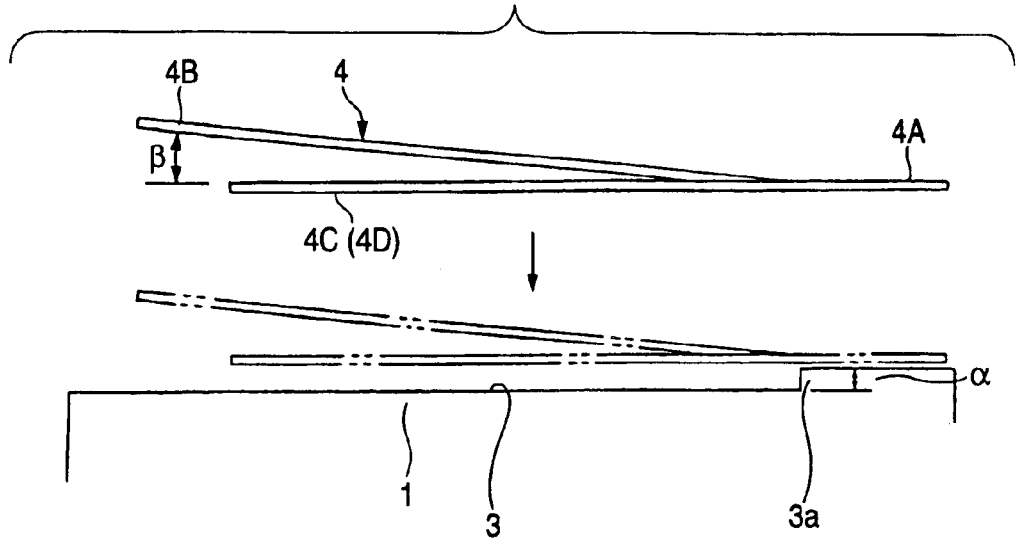
FIGS. 7A to 7C are schematic side views showing a procedure of fixing a resilient plate.
Figure 7B:
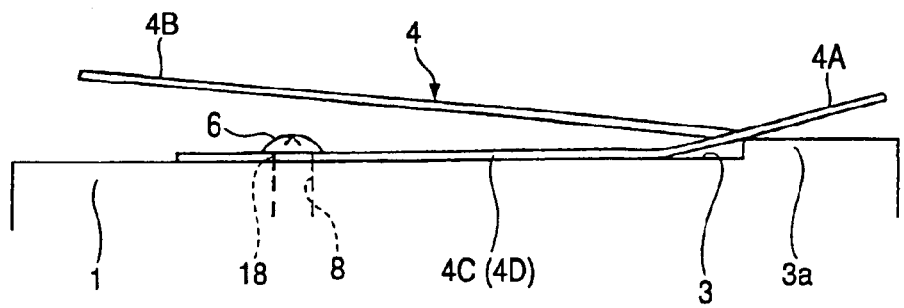
Figure 7C:
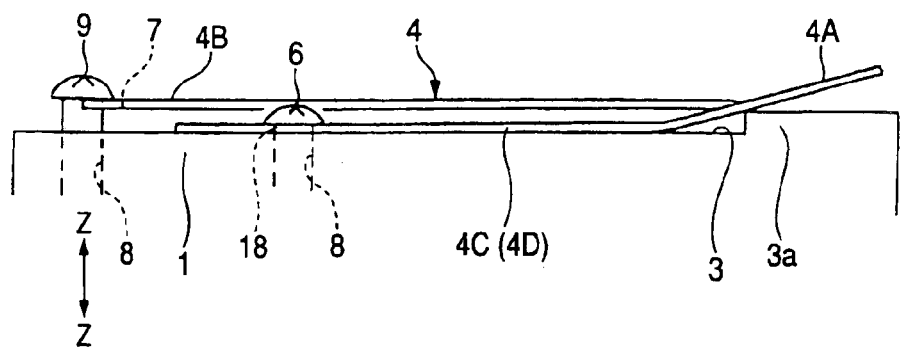

A description will be given of the procedure for positioning the photodiode PD. As shown in an exaggerated manner in FIG. 7A, the resilient plate 4 is inclined diagonally upward by a predetermined angle β (e.g., 5 to 10 degree) with respect to each of the leg portions 4C and 4D. The rear end portion 4A of the resilient plate 4 is first placed on the support pedestal 3*a*. Then, as shown in FIG. 7B, as each fixing screw 6 is screwed into the threaded hole 8 through the fixing hole 18 in each of the leg portions 4C and 4D, the rear end portion 4A of the resilient plate 4 is pressed against the support pedestal 3*a*. Subsequently, as shown in FIG. 7C, the adjusting screw 9 is screwed into the threaded hole 8 in the mounting surface 3 through an engaging slot 7 formed in a front end portion 4B of the resilient plate 4, thereby pressing down the resilient plate 4.

Figure 8A:
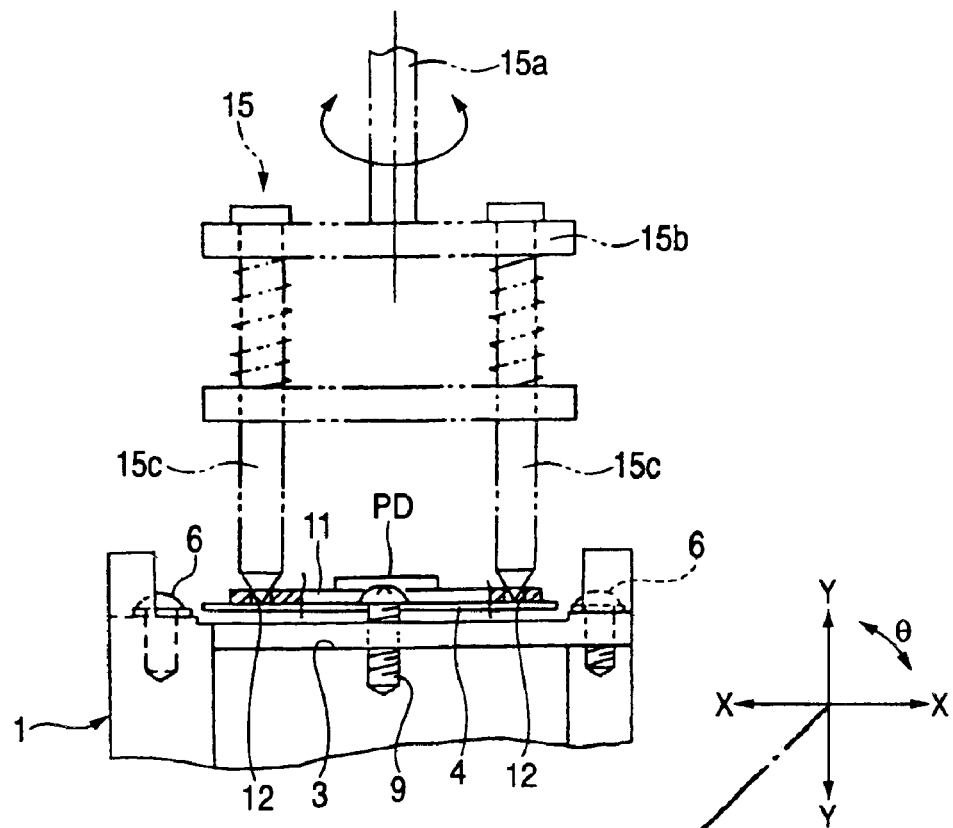
FIG. 8A is a front view of essential portions showing a procedure of positioning a photodiode.
Figure 8B:
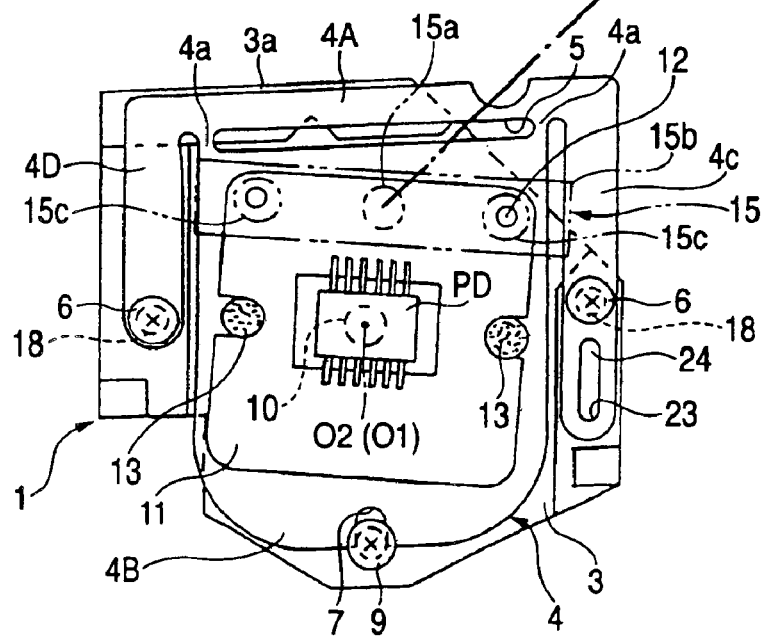
FIG. 8B is a plan view of the essential portions showing the same procedure.

Subsequently, as shown in FIGS. 8A and 8B, a printed circuit board 11 with a photodiode PD is placed on the resilient plate 4, and each engaging pin 15*c* of a positioning device 15 is engaged in each of both operation holes 12 in the printed circuit board 11. Then, laser light is projected from a laser diode LD onto a CD-use disk D, and the height of the resilient plate 4 is adjusted along the vertical direction Z by operating the adjusting screw 9. Further, the printed circuit board 11 is moved by fine adjustment in the horizontal longitudinal direction Y-Y and in the horizontal transverse direction X-X by operating the positioning device 15. The central axis O2 of a CD-use light-receiving portion of the photodiode PD is thereby aligned with the optical axis O1 of the laser light reflected from the disk D.

Subsequently, laser light is projected onto a DVD-use disk D replaced from the CD-use disk D, and the printed circuit board 11 is appropriately rotated forwardly or reversely about a main shaft 15*a* in a horizontal direction θ by fine adjustment by operating the positioning device 15. The central axis O2 of a DVD-use light-receiving portion of the photodiode PD is thereby aligned with the optical axis O1 of the laser light reflected from the DVD-use disk D.

Subsequently, an ultraviolet-curing adhesive 13 is applied between the printed circuit board 11 and the resilient plate 4, and ultraviolet rays are radiated to allow the ultraviolet-curing adhesive 13 to cure, thereby securing the printed circuit board 11 to the resilient plate 4.

Figure 10:
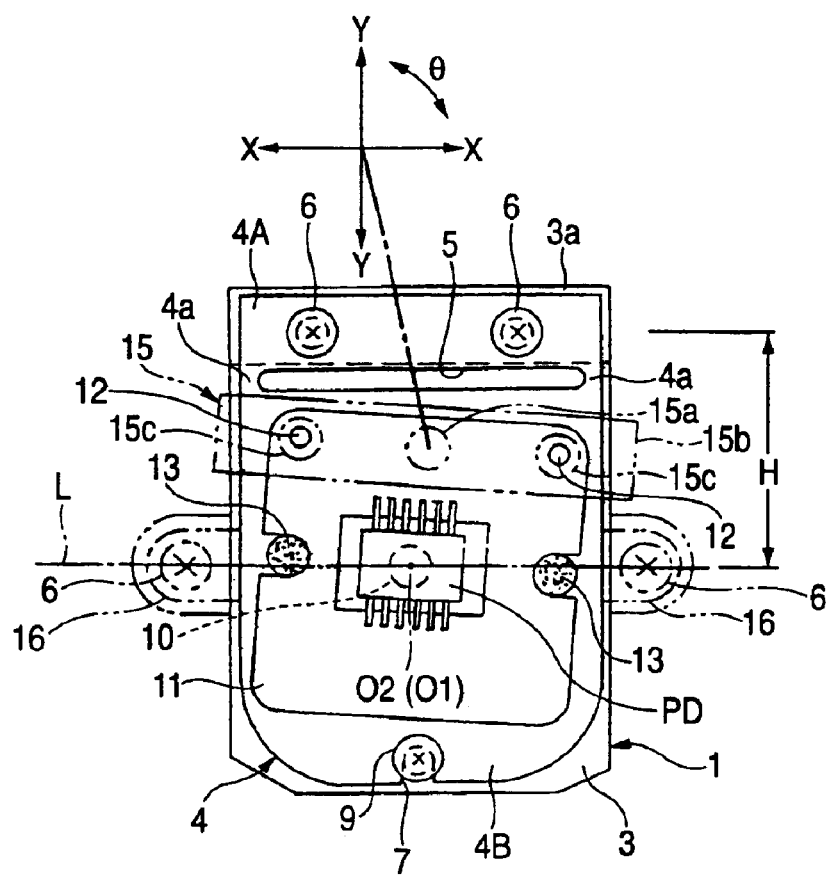
FIG. 10 is a modified example of the optical pickup.
Figure 11:
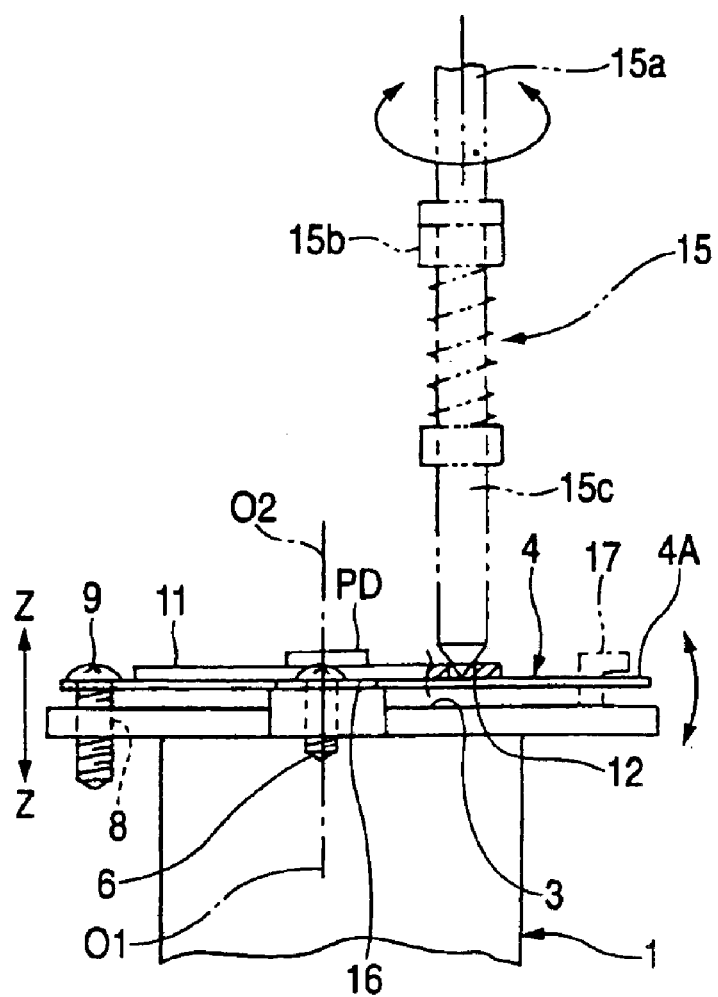
FIG. 11 is a side view showing another modified example.

Instead of the above described embodiment, a configuration shown in FIG. 10 may be conceived, in which the position of each fixing screw 6 is changed to that of the phantom line L passing through the central axis O2 of the photodiode PD and extending in the horizontal transverse direction X-X. A pair of tongues 16 projecting laterally from centers of both side edges of the resilient plate 4 are fixed to the mounting surface 3 by the fixing screws. According to this arrangement, even if the base 1 is thermally expanded, the optical axis O1 of the laser light does not offset from the central axis O2 of the photodiode PD in the horizontal longitudinal direction Y-Y. However, since the rear end portion 4A of the resilient plate 4 is not fixed, when the positioning of the photodiode PD is effected by engaging the engaging pin 15*c* of the positioning device 15 with the operation hole 12 in the printed circuit board 11, as shown in FIG. 11, the rear end portion 4A of the resilient plate 4 is likely to be swung vertically. Thus it is difficult to precisely position the photodiode PD in the vertical direction Z-Z.

Accordingly, as shown by the phantom lines in FIG. 11, it is conceivable to provide a substantially L-shaped hook 17 in such a manner as to project from a rear end portion of the mounting surface 3 and to cause a distal end of the hook 17 to catch the rear end portion 4A. With this arrangement, however, the rear end portion 4A of the resilient plate 4 is merely prevented from being lifted up. Therefore, in this case as well, the rear end portion 4A of the resilient plate 4 is likely to be pushed down when the positioning o the photodiode PD is effected by the positioning device 15, and it is difficult to precisely position the photodiode PD in the vertical direction Z-Z. In addition, since the hook 17 is provided projectingly on the mounting surface 3, the structure of a mold for molding the base 1 becomes complex, the cost of the mold becomes high, and the root portion of the hook is weak in strength and is likely to be damaged.

As was described above, according to the first aspect of the invention, since the rear end portion of the resilient plate is pressed against the support pedestal, at the time when the height of the resilient plate is adjusted by the adjusting screw, and the positioning of the photodiode is effected by moving the printed circuit board, which is disposed on the resilient plate, by fine adjustment in the horizontal direction, the rear end portion of the resilient plate is not swung vertically as in the conventional manner. The photodiode can thus be positioned precisely in the vertical direction.

In addition, the rear end portion of the resilient plate is not fixed, and a central portion of the resilient plate is set in a state of being fixed to the center of the base by the fixing screws by means of the leg portions. Therefore, even if the base is thermally expanded, the optical axis of the laser light projected from the laser diode is prevented from becoming offset in the horizontal longitudinal direction from the central axis of the photodiode provided in the central portion of the resilient plate. The accuracy of reading by the photodiode can be maintained at a high level.

Further, as the elliptical positioning projection provided projectingly on the mounting surface is merely engaged with the elongated engaging hole provided penetratingly in one leg portion, the resilient plate can be disposed at a predetermined position on the mounting surface, and each fixing hole can be positioned concentrically with each threaded hole. Therefore, each fixing screw can be speedily and easily screwed into each threaded hole through each fixing hole.

Furthermore, since it suffices if the support pedestal is merely formed on the mounting surface of the base, the structure of a mold for molding the base is simple, so that the cost of the mold becomes low. Since a weak portion in terms of strength such as the hook is not provided on the mounting surface, no damage is caused.

According to the second aspect of the invention, since the rear end portion of the resilient plate is pressed against the support pedestal, at the time when the height of the resilient plate is adjusted, and the positioning of the photodiode is effected by moving the printed circuit board, which is disposed on the resilient plate, by fine adjustment in the horizontal direction, the rear end portion of the resilient plate is not swung vertically as in the conventional manner. The photodiode can thus be positioned precisely in the vertical direction.

According to the third aspect of the invention, the rear end portion of the resilient plate is not fixed, and a central portion of the resilient plate is set in a state of being fixed to the center of the base by the fixing screws by means of the leg portions. Therefore, even if the base is thermally expanded, the optical axis of the laser light projected from the laser diode is prevented from becoming offset in the horizontal longitudinal direction from the central axis of the photodiode provided in the central portion of the resilient plate. The accuracy of reading by the photodiode can be maintained at a high level.

According to the fourth aspect of the invention, as the elliptical positioning projection provided projectingly on the mounting surface is merely engaged with the elongated engaging hole provided penetratingly in one leg portion, the resilient plate can be disposed at a predetermined position on the mounting surface, and each fixing hole can be positioned concentrically with each threaded hole. Therefore, each fixing screw can be speedily and easily screwed into each threaded hole through each fixing hole.

What is claimed is:

1. An optical pickup comprising:

a synthetic resin-made base in which a collimator lens and an objective lens are disposed at one end opening of a light passage hole with a half mirror, the base having a mounting surface formed on another end opening of the light passage hole that is penetrating the base;

a laser diode disposed in a laser hole communicating with the light passage hole;

a resilient plate made of a leaf spring having a first end portion secured to the mounting surface in such a manner as to be heightwise adjustable by an adjusting screw, and a pair of left and right leg portions formed integrally at both side edge portions of a second end portion that is opposite to the first end portion, the leg portions extending toward the first end portion along a horizontal longitudinal direction; and a printed circuit board with a photodiode, the printed circuit board secured to the resilient plate while being positioned in the horizontal longitudinal direction and a horizontal transverse direction;

wherein laser light is projected from the laser diode onto a disk through the half mirror, the collimator lens, and the objective lens, and reflected light thereof is received by the photodiode through the half mirror, so as to read information recorded on the disk;

a support pedestal which is one step higher is integrally formed at an end portion of the mounting surface;

a pair of fixing holes are respectively formed in the leg portions in such a manner as to be provided on a phantom line passing through a central axis of the photodiode and extending in the horizontal transverse direction;

a pair of threaded holes are respectively formed in both side edge portions of the mounting surface in face-to-face relation to the fixing holes;

an elongated engaging hole is penetratingly provided in a tip end portion of one of the leg portions along the horizontal longitudinal direction;

an elliptical positioning projection is projectingly provided on one of the side edge portions of the mounting surface in face-to-face relation to the engaging hole;

each of the leg portions is positioned on the mounting surface by engaging the positioning projection with the engaging hole; and fixing screws are respectively screwed into the threaded holes through the fixing holes in the leg portions, so as to press the second end portion of the resilient plate against the support pedestal.

2. An optical pickup comprising:

a synthetic resin-made base having a mounting surface formed thereon;

a resilient plate having a first end portion secured to the mounting surface in such a manner as to be heightwise adjustable by an adjusting screw, and a pair of left and right leg portions formed integrally at both side edge portions of a second end portion that is opposite to the first end portion, the leg portions extending toward the first end portion along a horizontal longitudinal direction;

a printed circuit board with a photodiode, the printed circuit board secured to the resilient plate while being positioned in the horizontal longitudinal direction and a horizontal transverse direction; and a laser diode;

wherein laser light is projected from the laser diode onto a disk, and reflected light thereof is received by the photodiode, so as to read information recorded on the disk;

a support pedestal which is one step higher is integrally formed on an end portion of the mounting surface; and a pair of fixing screws are respectively screwed into a pair of threaded holes in the mounting surface through a pair of fixing holes respectively provided penetratingly in the leg portions, so as to press the second end portion of the resilient plate against the support pedestal.

3. The optical pickup according to claim 2, wherein each of the fixing holes is provided on a phantom line passing through a central axis of the photodiode and extending in the horizontal transverse direction.

4. The optical pickup according to claim 2, wherein an elongated engaging hole is penetratingly provided in a tip end portion of one of the leg portions along the horizontal longitudinal direction;

an elliptical positioning projection is projectingly provided on the mounting surface in face-to-face relation to the engaging hole; and the resilient plate is positioned on the mounting surface by engaging the positioning projection with the engaging hole.

5. The optical pickup according to claim 3, wherein an elongated engaging hole is penetratingly provided in a tip end portion of one of the leg portions along the horizontal longitudinal direction;

an elliptical positioning projection is projectingly provided on the mounting surface in face-to-face relation to the engaging hole; and the resilient plate is positioned on the mounting surface by engaging the positioning projection with the engaging hole.

6. The optical pickup according to claim 2, wherein a photodiode fixing portion of the resilient plate on which the printed circuit board is secured is inclined upward by a predetermined angle with respect to each of the leg portions before being hightwise adjusted by the adjusting screw.

* * * * *